US008682643B1

(12) United States Patent
Hafez

(10) Patent No.: US 8,682,643 B1
(45) Date of Patent: Mar. 25, 2014

(54) RANKING TRANSLITERATION OUTPUT SUGGESTIONS

(75) Inventor: Khaled Hafez, Zurich (CH)

(73) Assignee: Google Inc., Mountain View, CA (US)

( * ) Notice: Subject to any disclaimer, the term of this patent is extended or adjusted under 35 U.S.C. 154(b) by 687 days.

(21) Appl. No.: 12/943,825

(22) Filed: Nov. 10, 2010

(51) Int. Cl.
*G06F 17/28* (2006.01)

(52) U.S. Cl.
USPC ............ 704/5; 704/2; 704/7; 704/9; 704/257; 704/277

(58) Field of Classification Search
USPC .................. 704/5, 2, 7, 9, 257, 277
See application file for complete search history.

(56) References Cited

U.S. PATENT DOCUMENTS

| | | | |
|---|---|---|---|
| 7,983,898 B2* | 7/2011 | Moore | 704/2 |
| 2004/0172247 A1* | 9/2004 | Yoon et al. | 704/251 |
| 2008/0221866 A1* | 9/2008 | Katragadda et al. | 704/8 |
| 2009/0112573 A1* | 4/2009 | He | 704/4 |
| 2010/0094614 A1* | 4/2010 | Bilac et al. | 704/2 |

* cited by examiner

*Primary Examiner* — Qi Han
(74) *Attorney, Agent, or Firm* — Remarck Law Group PLC

(57) ABSTRACT

Methods, systems, and apparatus, including computer program products, for ranking the output suggestions of a transliteration process. In one aspect, a method includes receiving a plurality of transliteration training pairs comprising a source word in a first writing system and a target word in a second writing system. A plurality of 1-to-N transliteration rules is received. Blocks are generated for each source word character comprising the source word character and a string characters preceding and following the source word character. Generated blocks are associated with the right-hand-side of respective 1-to-N transliteration rules to create a plurality of block rules. Block rules are used to generate a possibly-partial transliteration of a source word. A score is assigned based on an edit distance between the source word and each of one or more respective transliteration output suggestions.

20 Claims, 5 Drawing Sheets

Training Mode

RANKING TRANSLITERATION OUTPUT SUGGESTIONS

BACKGROUND

This specification relates to transliteration.

Transliteration converts text in one writing system to text in another writing system. Each writing system can be used for the same or for different natural languages.

Computers can be used to provide automatic transliteration of an input text. Computers connected to a network, such as the Internet, can be used to provide a networked transliteration service.

For a given source word in a first writing system, an automatic transliteration service may provide multiple transliteration output suggestions in a second writing system. Multiple transliteration output suggestions may be provided because there may exist only an imperfect mapping from the first writing system to the second writing system.

SUMMARY

This specification relates to technologies for ranking the output suggestions of a transliteration service. A general automatic transliteration service can provide multiple output suggestions, but these suggestions may be unordered. A ranking system can order transliteration output suggestions using information from an observed set of trusted transliteration pairs.

In general, one innovative aspect of the subject matter described in this specification can be embodied in methods that include the actions of receiving a plurality of transliteration training pairs, where each training pair comprises a source word in a first writing system and a target word in a second writing system, where the target word is a transliteration of the source word, and the source word comprises one or more source word characters, receiving a plurality of 1-to-N transliteration rules, each 1-to-N transliteration rule mapping a source writing system character to a right-hand-side, the right-hand-side being a null string or a string of one or more target writing system characters, for each source word in the training pairs and each source word character in the source word, the source word character corresponding to a 1-to-N transliteration rule, generating one or more blocks, where each block comprises the source word character, a string of one or more characters preceding the source word character in the source word, and a string of one or more characters following the source word character in the source word, and associating with each generated block the right-hand-side of the 1-to-N transliteration rule corresponding to the source word character, for each block, incrementing a block-specific sum of occurrences of each associated right-hand-side, and generating a plurality of block rules, each block rule mapping a block to a most frequently occurring right-hand-side for the block.

These and other embodiments can each optionally include one or more of the following features. The actions can further comprise generating the plurality of 1-to-N transliteration rules by converting one or more M-to-N transliteration rules into one or more 1-to-N transliteration rules, where M-to-N transliteration rules map from a source string of M characters to a target string of N characters. Converting M-to-N transliteration rules into 1-to-N transliteration rules comprises mapping a first character of the source string to the target string, and mapping each remaining character of the source string to null. Generating the one or more blocks comprises using a minimum preceding string size, a minimum following string size, and a minimum block size as constraints. Generating the plurality of block rules further comprises, for each block, comparing a ratio to a threshold, where the ratio is a number of occurrences of the most frequently occurring right-hand-side relative to a number of occurrences of a second most frequently occurring right-hand-side for associated with the respective block. The threshold is twice the occurrences of the second most frequently occurring right-hand-side.

Another innovative aspect of the subject matter described in this specification can be embodied in methods that include the actions of receiving a source word in a first writing system and one or more transliteration suggestions of the source word in a second writing system, for each source word character in the source word, generating one or more blocks, where each block comprises the source word character, a string of one or more characters preceding the source word character in the source word, and a string of one or more characters following the source word character in the source word, matching each of the one or more of the blocks to a respective block rule, where a block rule maps a block to a right-hand-side, and selecting a block rule for the source word character from among the matching block rules, generating a possibly-partial transliteration of the source word by replacing each source word character with a right-hand-side of the block rule selected for the source word character, calculating a score based on an edit distance between the possibly-partial transliteration and each transliteration suggestion, and ordering the transliteration suggestions according to the score.

Particular embodiments of the subject matter described in this specification can be implemented to realize one or more of the following advantages. Ranking output suggestions of a transliteration service will more often result in the correct transliteration being provided first in a list of transliteration suggestions. Ranking the output suggestions will make transliterating text less time-consuming and less tedious for users of the transliteration service.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
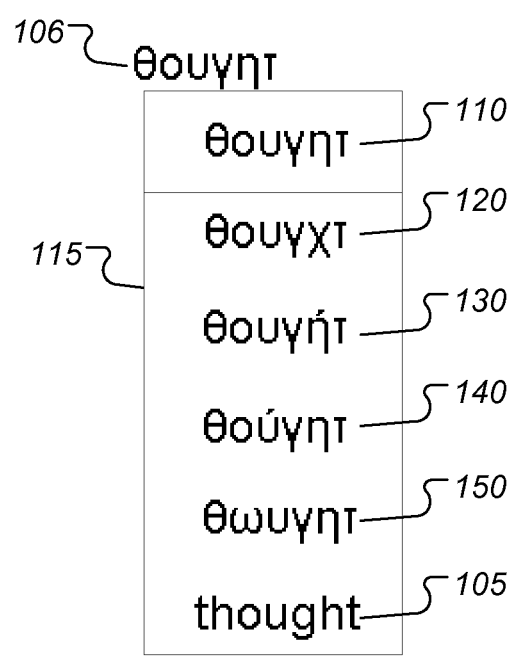
FIG. 1 illustrates an example output of an automatic transliteration system.

FIG. 1 illustrates an example output of an automatic transliteration system. An automatic transliteration system uses one or more computers to receive a source word in a first writing system and to provide one or more transliteration output suggestions in a second writing system. Computers connected to the Internet can be used to implement a networked transliteration system. A natural language expressed by each writing system may be the same natural language or a different natural language.

The automatic transliteration system may provide a graphical interface as shown in FIG. 1. For the source word "thought" 105 in a first writing system, the transliteration system may provide an output word 106 in a second writing system. In this example, the first writing system uses the Latin alphabet for the natural language English. The second writing system uses the Greek alphabet for the natural language English. In some implementations, the output word 106 is the best transliteration suggestion as determined by the transliteration system. The transliteration suggestions may be assigned a score by the transliteration system, where the best transliteration suggestion has been assigned the highest score.

The graphical user interface of the automatic transliteration system may allow the user to click on the output word 106 to request a list of transliteration suggestions 115. The list may include the original output word 106 and the source word 105. The list 115 is populated with transliteration suggestions 110, 120, 130, 140, and 150. The transliteration system determines a score for each suggestion, as described below. The transliteration suggestions may be listed in a decreasing order of the scores of the suggestions.

Figure 2:
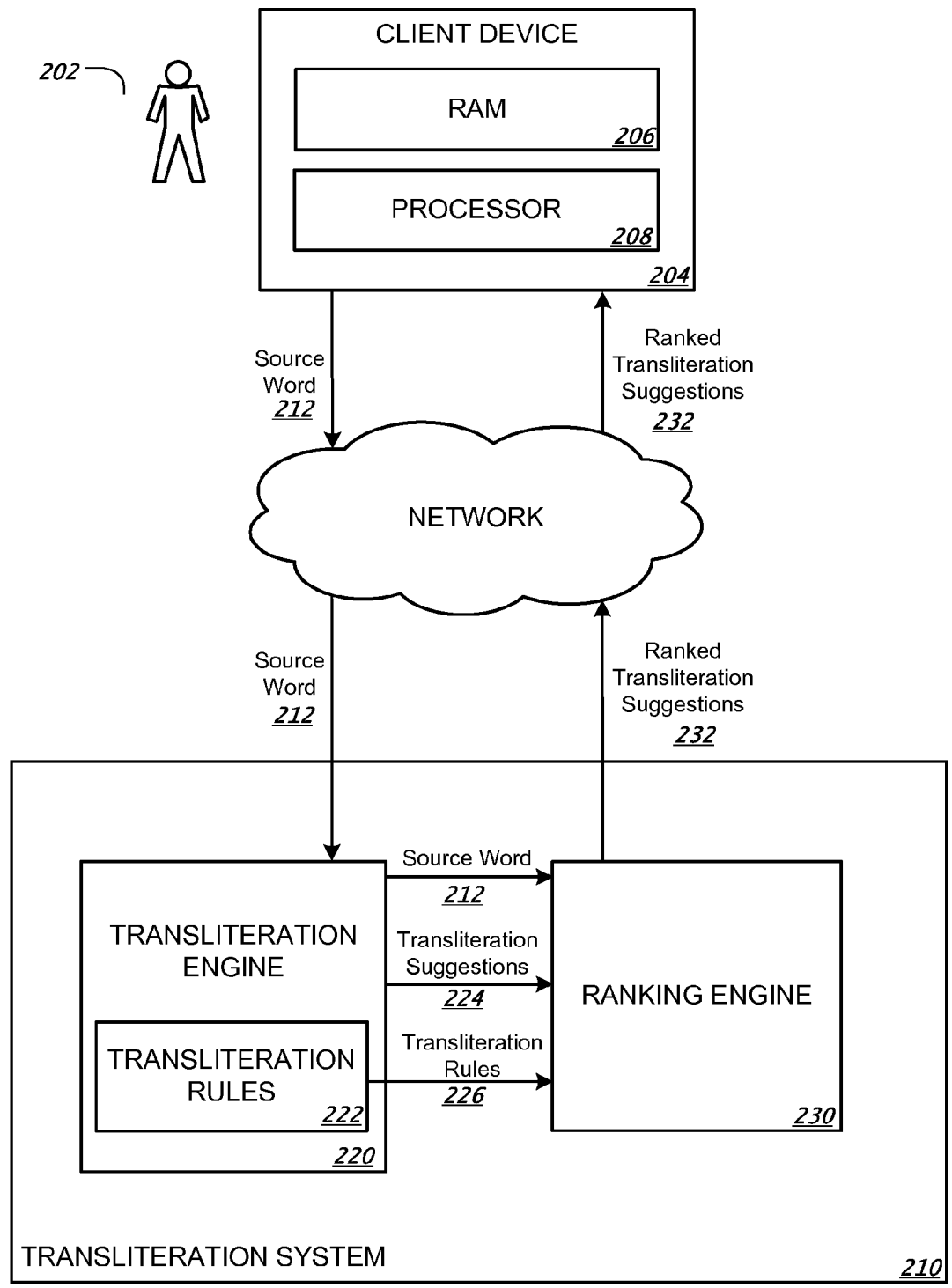
FIG. 2 is a diagram of an example transliteration system.

FIG. 2 is a diagram of an example transliteration system 210. The example transliteration system 210 can provide transliterated output text in a second writing system for submitted input text in a first writing system. The transliteration system 210 can be implemented on computers in an Internet, an intranet, or other client and server environment. The transliteration system 210 is an example of a data processing system in which the systems, components, and techniques described below can be implemented.

A user 202 can interact with the transliteration system 210 through a user device 204. For example, the device 204 can be a computer coupled to the transliteration system 210 through a local area network (LAN) or wide area network (WAN), e.g., the Internet, a wireless network, or a combination of them. The transliteration system 210 can optionally be implemented in the user device 204. For example, a user can install a transliteration application on a user device 204 that is a personal computer or a smart phone, for example.

A user 202 can submit a source word 212 to a transliteration engine 220 within a transliteration system 210. The transliteration system 210 can be implemented as, for example, one or more computer programs running on one or more computers in one or more locations that are coupled to each other through a network. The transliteration system 210 includes the transliteration engine 220 and a ranking engine 230. The transliteration system 210 responds to the source word 212 by generating ranked transliteration suggestions 232. If the user device 204 is remote, the ranked transliteration suggestions 232 are transmitted to the user device 204 for presentation to the user 202 (e.g., in a graphical interface to be displayed in a web browser running on the user device 204).

When a source word 212 is received by the transliteration engine 220, the transliteration engine 220 uses a set of transliteration rules 222 to generate a set of transliteration suggestions 224. The transliteration system 210 can include a ranking engine 230 to rank the transliteration suggestions 224. The ranking engine 230 can read transliteration rules 226 from the set of transliteration rules 222.

The ranking engine 230 can rank the transliteration suggestions 224 into ranked transliteration suggestions 232. The ranking engine 230 can transmit the ranked transliteration suggestions 232 through the network to the user device 204 for presentation to the user 202.

One approach to providing automatic transliteration is rule-based transliteration. In rule-based transliteration, transliteration rules (e.g., transliteration rules 222) map from one or more characters in a source writing system to one or more characters in a target writing system. In other words, general transliteration rules are M-to-N transliteration rules, providing a mapping between a string of M characters in a source writing system and a string of N characters in a target writing system. For example, a transliteration system may include the following transliteration rule for transliterating from the Latin alphabet to the Greek alphabet:

th=>θ.

In other words, the two characters "th" in the Latin alphabet may be replaced with a single character (theta) in the Greek alphabet. This particular rule may be used by a transliteration system when transliterating from "they" in the Latin alphabet to "θει" in the Greek alphabet.

A ranking engine for ranking transliteration suggestions (e.g., ranking engine 230) can use general M-to-N transliteration rules to rank transliteration suggestions. In some implementations, a ranking engine may convert the general M-to-N transliteration rules into 1-to-N transliteration rules for ranking transliteration suggestions. For example, the general M-to-N transliteration rule xyz=>ABC may be reinterpreted by a ranking engine as the 1-to-N transliteration rule x=>ABC.

The ranking engine can convert all M-to-N rules into 1-to-N transliteration rules. The ranking engine also records conditions under which each 1-to-N rule was created. In this example, the 1-to-N transliteration rule "x=>ABC" was applied under the conditions of "x" being followed by "yz." These conditions can be referred to as the rule context.

In some implementations, if the source string contains more than one character, the system forms 1-to-N rules by mapping the first character to the full target string and maps the remaining M-to-N source string characters to null. In this example, two further rules will be deduced from the M-to-N rule for "y" and "z" respectively, including "y=>null" (when preceded by "x" and followed by "z"), and "z=>null" (when preceded by "xy"). After converting the M-to-N transliteration rules, the ranking engine will have a set of 1-to-N transliteration rules that can be used to train the ranking engine.

The rule context (e.g., "when preceded by 'xy'") can be stored by the ranking engine as blocks. The blocks contain a source word character and its preceding and following strings of source word characters. Multiple blocks are possible for a given source character. Various system parameters can determine the permissible contexts that can be stored as blocks. These system parameters include a minimum preceding string size, a minimum following string size, and a minimum block size. The minimum block size is defined as the minimum preceding string size plus the minimum following string size.

Figure 3:
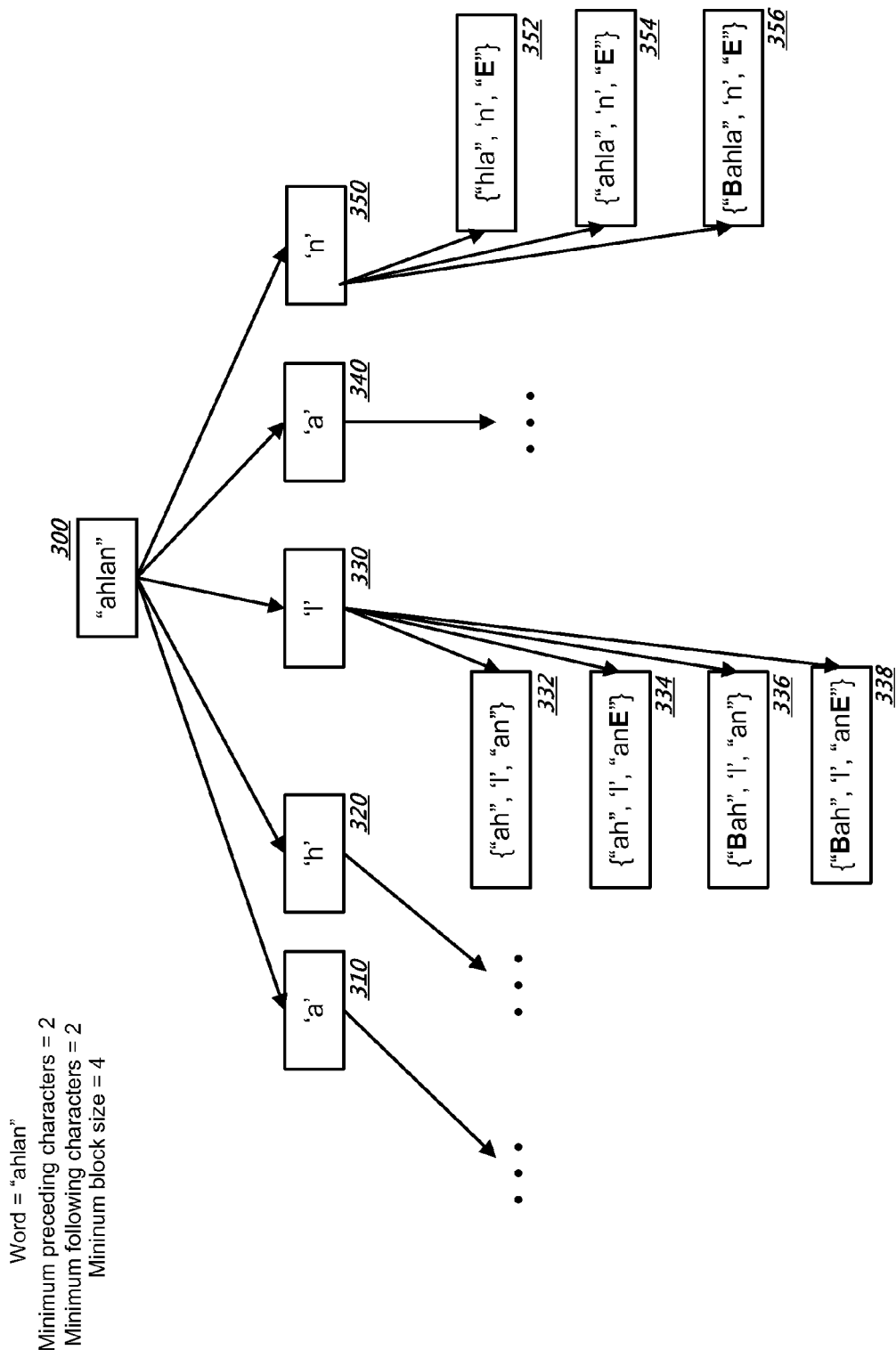
FIG. 3 is an illustration of blocks created from a source word in a source writing system.

FIG. 3 is an illustration of blocks created from a source word in a source writing system. The blocks shown in FIG. 3 can, for example, be created by a ranking engine. Creating blocks for a source word (e.g., source word "ahlan") requires enumerating permissible contexts for each character in the source word. Permissible contexts can be constrained by the system parameters minimum preceding string size, minimum following string size, and minimum block size.

Source word "ahlan" 300 is broken into its constituent characters 310, 320, 330, 340, and 350. For each of the characters, permissible contexts are defined according to the system parameters. In this example, the system parameters have been defined as follows: minimum preceding string size is 2, minimum following string size is 2, and minimum block size is 4. Word boundaries are indicated in FIG. 3 by the special characters "B" and "E". In some implementations, one or more reserved characters can be used to indicate word boundaries at the beginning or end of a source word. In some other implementations, when the preceding or following strings contain only a word boundary, the corresponding string size is 1. In other words, the special characters "B" and "E" are counted as regular source word characters.

Permissible contexts for source character "l" 330 are enumerated and stored as blocks 332, 334, 336, and 338. Similarly, permissible contexts for source character "n" 350 are enumerated and stored as blocks 352, 354, and 356. In this example, the block {"la", "n", "E"} is an impermissible context because the size of this block is only 3, while the system parameter of minimum block size is 4. Therefore, the impermissible context is not stored as a block.

A ranking engine can operate in training mode or scoring mode. In training mode, the ranking engine can identify a set of dominant conditions under which each identified 1-to-N transliteration rule was applied. In scoring mode, the set of dominant conditions for applying the 1-to-N transliteration rules can be used to provide a ranking of transliteration suggestions.

Figure 4:
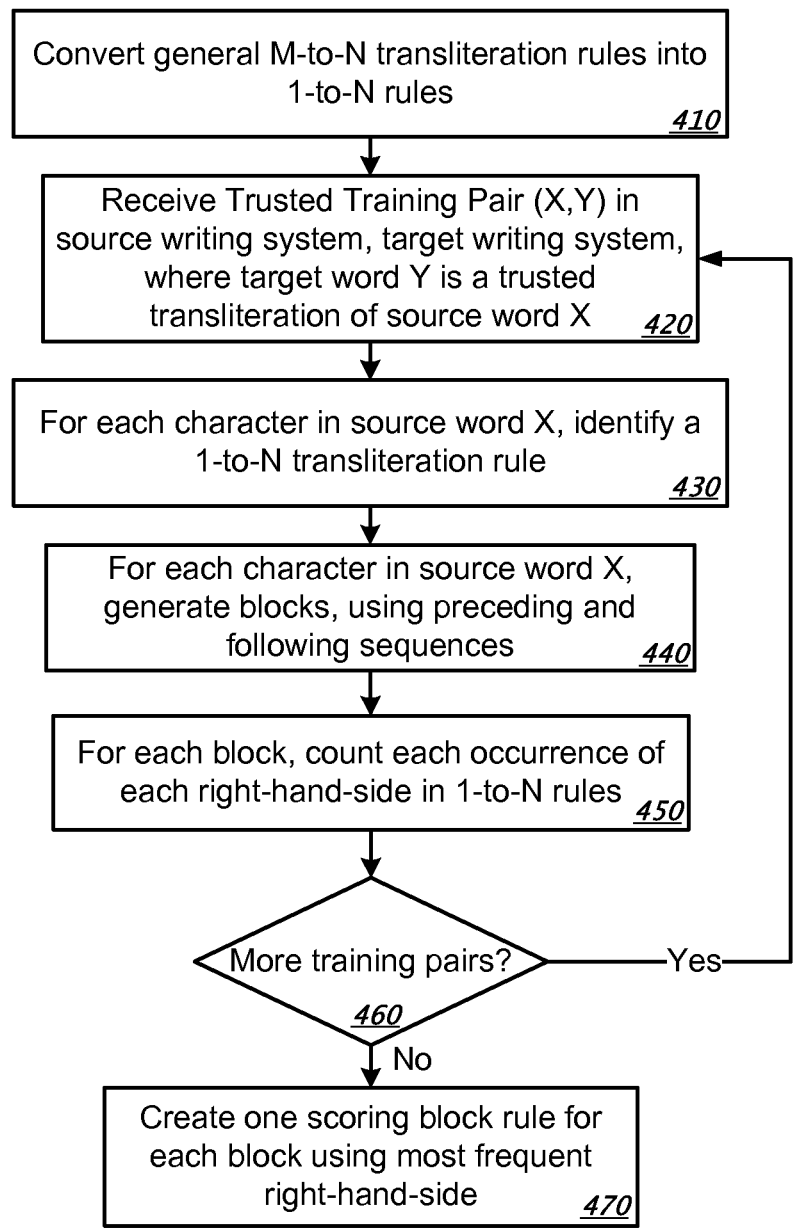
FIG. 4 is a flowchart of an example training process for generating block rules.

FIG. 4 is a flowchart of an example training process for generating block rules. The process will be described as being performed by a computer system that includes one or more computers, e.g., the ranking engine described above. The system, e.g., the ranking engine in training mode, takes as input the general M-to-N transliteration rules and trusted training pairs.

The system converts the general M-to-N transliteration rules into 1-to-N transliteration rules (410). In some implementations, the first character of the source string maps to the full target string, while any remaining characters of the source string map to null.

The system receives a trusted training pair (X,Y), where Y is a transliteration of X (420). Each training pair has a source word in a first writing system and corresponding transliterated target word in a second writing system. The trusted training pairs can be pairs identified as having a high degree of transliteration confidence. The trusted training pairs can be chosen by human operators, or they can be selected by using feedback from logs of a transliteration service. For example, the selected pairs could be chosen from transliteration suggestions that are frequently chosen by system users. This can be done without collecting any personal information about the users.

For each character in source word X, the system uses the target word of the training pair to identify a single 1-to-N transliteration rule (430). The target string of each 1-to-N rule is compared to the target word of the training pair to select one of the 1-to-N rules for each source character.

For each character in source word X, the system generates blocks using permissible strings of characters preceding and following the source character (440). The blocks contain the source word character, a string of characters preceding the source word character, and a string characters following the source word character. Multiple blocks are possible for a given source character. The blocks can be generated as set forth above with reference to FIG. 3. All permissible blocks for a given source character can be generated.

For each block created, a count of occurrences of each right-hand-side (i.e., the N characters) of each corresponding 1-to-N rule is recorded (450). After processing all training pairs, the ranking engine can identify conditions, which are represented by blocks, under which each 1-to-N rule was applied most frequently by using the right-hand-side counts for each block. From the previous example above using the general M-to-N rule "xyz=>ABC", the ranking engine can store the block {B, x, yz} as a possible block. The ranking engine will then record the occurrence of the right hand side of the 1-to-N rule ("ABC") by increasing the count of this right-hand-side associated with the block.

The system determines if training pairs remain to be processed (460). If no training pairs remain, the system creates block rules (branch to 470). If training pairs remain, the process returns to 420 to receive additional training pairs.

For each block, the system creates a block rule using the most frequently occurring right-hand-side (470). A block rule is created by associating a block with a right hand side. For example, the system may create the block rule "{B, x, yz}=>ABC" if "ABC" was the most frequently occurring right-hand-side for block {B, x, yz}. In some implementations, block rules are generated for a block only if the most frequently occurring right-hand-side is sufficiently dominant over other occurring right-hand-sides. The dominance can be measured by a ratio of the most frequently occurring right-hand-side to the second most frequently occurring right-hand-side. The system can require that the ratio be 2:1 or greater. In other words, before creating a block rule for a particular block, the system can require that the most frequently occurring right-hand-side occurred at least twice as often as the second most frequently occurring right hand side. Alternatively, the ratio can be set higher or lower, e.g., 3:1 or 1.5:1, or the range can be tuned based on a measured quality of the transliteration rankings produced using the block rules, e.g., how frequently a top ranked transliteration is selected.

After the ranking engine has processed all trusted training pairs and created block rules, the ranking engine can be used for scoring. Engines or computers other than the ranking engine can also be used to perform scoring by using block rules created by the ranking engine.

Figure 5:
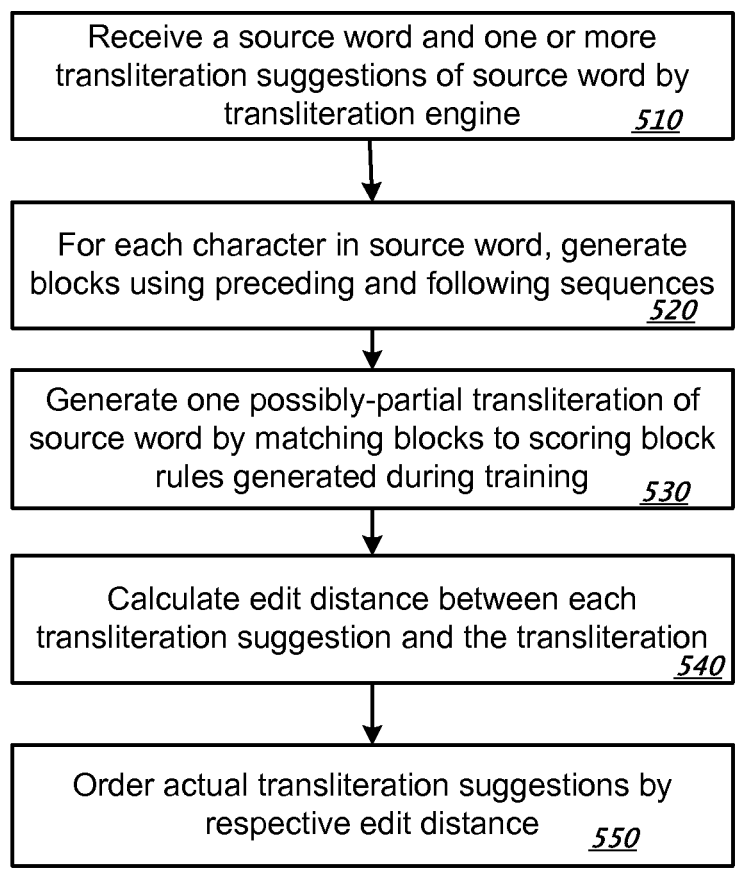
FIG. 5 is a flowchart of an example scoring process for scoring transliterations.

FIG. 5 is a flowchart of an example scoring process for scoring transliterations. The process will be described as being performed by a computer system that includes one or more computers, e.g., the ranking engine described above. The system, e.g., the ranking engine in scoring mode, takes as input a source word and one or more transliteration suggestions from a transliteration process. The ranking engine can use the block rules of the kind described above to score transliteration suggestions received from a transliteration engine.

The system receives from a transliteration engine a source word in a first writing system and one or more transliteration suggestions in a target writing system (510).

For each character in the source word, the system generates blocks using permissible combinations of character strings preceding and following the source character (520). The blocks can be generated as set forth above with reference to FIG. 3.

The system generates a possibly-partial transliteration of the source word by attempting to match blocks created from the source word to block rules generated during training (530). If a block created from the source word matches a block rule, the right-hand-side of the block rule is used to transliterate that source word character into one or more characters in the target writing system. If more than one block rule matches blocks created from the source word, the system selects a block rule with a statistical dominance over other matching block rules. A statistical dominance could be determined, for example, by the number of right-hand-side occurrences for the block rule.

The system calculates an edit distance between the possibly-partial transliteration and each transliteration suggestion (540). The edit distance can be used to assign a score to each transliteration suggestion. The score provides a measure of confidence that the transliteration suggestion is the correct transliteration.

In some other implementations, supervised machine learning is used train a model with the block rules. The model can be used to calculate a measure of confidence for each source character, given its candidate transliteration character in the transliteration suggestion. Computing a product of all confidences for all source characters yields an overall confidence, i.e., a score, for the transliteration suggestion.

The system orders the transliteration suggestions by respective edit distance (550). The order can be used to provide ranked transliteration suggestions, e.g., ranked transliteration suggestions 232, as shown in FIG. 2.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a data processing apparatus having one or more processors, a plurality of transliteration training pairs, where each training pair comprises a source word in a first writing system and a target word in a second writing system, where the target word is a transliteration of the source word, and the source word comprises one or more source word characters;
   receiving, by the data processing apparatus, a plurality of 1-to-N transliteration rules, each 1-to-N transliteration rule mapping a source writing system character to a right-hand-side, the right-hand-side being a null string or a string of one or more target writing system characters;
   for each source word in the training pairs and each source word character in the source word, the source word character corresponding to a 1-to-N transliteration rule:
      generating, by the data processing apparatus, one or more blocks, where each block comprises the source word character, a string of one or more characters preceding the source word character in the source word, and a string of one or more characters following the source word character in the source word, and associating with each generated block the right-hand-side of the 1-to-N transliteration rule corresponding to the source word character;
   for each block, incrementing, by the data processing apparatus, a block-specific sum of occurrences of each associated right-hand-side; and
   generating, by the data processing apparatus, a plurality of block rules, each block rule mapping a block to a most frequently occurring right-hand-side for the block.

2. The method of claim 1, further comprising:
   generating, by the data processing apparatus, the plurality of 1-to-N transliteration rules by converting one or more M-to-N transliteration rules into one or more 1-to-N transliteration rules, where M-to-N transliteration rules map from a source string of M characters to a target string of N characters.

3. The method of claim 2, where converting comprises:
   mapping a first character of the source string to the target string; and
   mapping each remaining character of the source string to null.

4. The method of claim 1, where generating the one or more blocks comprises using a minimum preceding string size, a minimum following string size, and a minimum block size as constraints.

5. The method of claim 1, where generating the plurality of block rules further comprises, for each block, comparing a ratio to a threshold, where the ratio is a number of occurrences of the most frequently occurring right-hand-side relative to a number of occurrences of a second most frequently occurring right-hand-side associated with the respective block.

6. The method of claim 5, where the threshold is twice the occurrences of the second most frequently occurring right-hand-side.

7. A computer-implemented method comprising:
   receiving, by a data processing apparatus having one or more processors, a source word in a first writing system and one or more transliteration suggestions of the source word in a second writing system;
   for each source word character in the source word, generating, by the data processing apparatus, one or more blocks, where each block comprises the source word character, a string of one or more characters preceding the source word character in the source word, and a string of one or more characters following the source word character in the source word;
   matching, by the data processing apparatus, each of the one or more of the blocks to a respective block rule, where a block rule maps a block to a right-hand-side, and selecting a block rule for the source word character from among the matching block rules;
   generating, by the data processing apparatus, a possibly-partial transliteration of the source word by replacing each source word character with a right-hand-side of the block rule selected for the source word character;
   calculating, by the data processing apparatus, a score based on an edit distance between the possibly-partial transliteration and each transliteration suggestion; and
   ordering, by the data processing apparatus, the transliteration suggestions according to the score.

8. A data processing apparatus, comprising
   one or more processors; and
   a non-transitory, computer readable medium storing instructions that, when executed by the one or more processors, cause the data processing apparatus to perform operations comprising:
   receiving a plurality of transliteration training pairs, where each training pair comprises a source word in a first writing system and a target word in a second writing system, where the target word is a transliteration of the source word, and the source word comprises one or more source word characters;

receiving a plurality of 1-to-N transliteration rules, each 1-to-N transliteration rule mapping a source writing system character to a right-hand-side, the right-hand-side being a null string or a string of one or more target writing system characters;

for each source word in the training pairs and each source word character in the source word, the source word character corresponding to a 1-to-N transliteration rule:
  generating one or more blocks, where each block comprises the source word character, a string of one or more characters preceding the source word character in the source word, and a string of one or more characters following the source word character in the source word, and associating with each generated block the right-hand-side of the 1-to-N transliteration rule corresponding to the source word character;

for each block, incrementing a block-specific sum of occurrences of each associated right-hand-side; and generating a plurality of block rules, each block rule mapping a block to a most frequently occurring right-hand-side for the block.

9. The data processing apparatus of claim 8, where the operations further comprise:
  generating the plurality of 1-to-N transliteration rules by converting one or more M-to-N transliteration rules into one or more 1-to-N transliteration rules, where M-to-N transliteration rules map from a source string of M characters to a target string of N characters.

10. The data processing apparatus of claim 9, where converting comprises:
  mapping a first character of the source string to the target string; and
  mapping each remaining character of the source string to null.

11. The data processing apparatus of claim 8, where generating the one or more blocks comprises using a minimum preceding string size, a minimum following string size, and a minimum block size as constraints.

12. The data processing apparatus of claim 8, where generating the plurality of block rules further comprises, for each block, comparing a ratio to a threshold, where the ratio is a number of occurrences of the most frequently occurring right-hand-side relative to a number of occurrences of a second most frequently occurring right-hand-side associated with the respective block.

13. The data processing apparatus of claim 12, where the threshold is twice the occurrences of the second most frequently occurring right-hand-side.

14. The data processing apparatus of claim 8, where the operations further comprise:
  receiving a second source word in the first writing system and one or more transliteration suggestions of the second source word in the second writing system;
  for each second source word character in the second source word, generating one or more blocks, where each block comprises the second source word character, a string of one or more characters preceding the second source word character in the second source word, and a string of one or more characters following the second source word character in the second source word;
  matching each of the one or more of the blocks of the second source word to a respective block rule, where a block rule maps a block to a right-hand-side, and selecting a block rule for the second source word character from among the matching block rules;
  generating a possibly-partial transliteration of the second source word by replacing each second source word character with a right-hand-side of the block rule selected for the second source word character;
  calculating a score based on an edit distance between the possibly-partial transliteration and each transliteration suggestion; and
  ordering the transliteration suggestions according to the score.

15. A non-transitory, computer readable medium storing instructions that, when executed by one or more processors, cause the one or more processors to perform operations comprising:
  receiving a plurality of transliteration training pairs, where each training pair comprises a source word in a first writing system and a target word in a second writing system, where the target word is a transliteration of the source word, and the source word comprises one or more source word characters;
  receiving a plurality of 1-to-N transliteration rules, each 1-to-N transliteration rule mapping a source writing system character to a right-hand-side, the right-hand-side being a null string or a string of one or more target writing system characters;
  for each source word in the training pairs and each source word character in the source word, the source word character corresponding to a 1-to-N transliteration rule:
    generating one or more blocks, where each block comprises the source word character, a string of one or more characters preceding the source word character in the source word, and a string of one or more characters following the source word character in the source word, and associating with each generated block the right-hand-side of the 1-to-N transliteration rule corresponding to the source word character;
  for each block, incrementing a block-specific sum of occurrences of each associated right-hand-side; and
  generating a plurality of block rules, each block rule mapping a block to a most frequently occurring right-hand-side for the block.

16. The computer readable medium of claim 15, where the operations further comprise:
  generating the plurality of 1-to-N transliteration rules by converting one or more M-to-N transliteration rules into one or more 1-to-N transliteration rules, where M-to-N transliteration rules map from a source string of M characters to a target string of N characters.

17. The computer readable medium of claim 16, where converting comprises:
  mapping a first character of the source string to the target string; and
  mapping each remaining character of the source string to null.

18. The computer readable medium of claim 15, where generating the one or more blocks comprises using a minimum preceding string size, a minimum following string size, and a minimum block size as constraints.

19. The computer readable medium of claim 15, where generating the plurality of block rules further comprises, for each block, comparing a ratio to a threshold, where the ratio is a number of occurrences of the most frequently occurring right-hand-side relative to a number of occurrences of a second most frequently occurring right-hand-side associated with the respective block.

20. The computer readable medium of claim 19, where the threshold is twice the occurrences of the second most frequently occurring right-hand-side.

\* \* \* \* \*